(12) United States Patent
Lo

(10) Patent No.: US 9,664,323 B2
(45) Date of Patent: May 30, 2017

(54) COUPLER

(71) Applicant: YUAN-MEI CORP., Changhua County (TW)

(72) Inventor: Shun-Nan Lo, Changhua County (TW)

(73) Assignee: YUAN-MEI CORP., Changhua County (TW)

( * ) Notice: Subject to any disclaimer, the term of this patent is extended or adjusted under 35 U.S.C. 154(b) by 221 days.

(21) Appl. No.: 14/568,064

(22) Filed: Dec. 11, 2014

(65) Prior Publication Data

US 2016/0165818 A1    Jun. 16, 2016

(51) Int. Cl.
    *F16L 37/42*          (2006.01)

(52) U.S. Cl.
    CPC ..................... *F16L 37/42* (2013.01)

(58) Field of Classification Search
    CPC ................... F16L 37/42; F16L 37/40
    USPC .................................... 285/276, 277
    See application file for complete search history.

(56) References Cited

U.S. PATENT DOCUMENTS

| | | | | |
|---|---|---|---|---|
| 2,135,222 A * | 11/1938 | Scheiwer | ................ | F16L 37/42 285/277 |
| 2,265,267 A * | 12/1941 | Cowles | ................... | F16L 37/42 285/276 |
| 2,536,702 A * | 1/1951 | Scheiwer | ................ | F16L 37/23 285/277 |
| 2,568,516 A * | 9/1951 | Scheiwer | ................ | F16L 37/40 285/277 |
| 2,730,382 A * | 1/1956 | De Mastri | ............... | F16L 37/40 285/277 |
| 2,848,255 A * | 8/1958 | Klein | ...................... | F16N 21/04 285/276 |
| 2,850,298 A * | 9/1958 | Clark | ...................... | F16L 37/23 285/277 |
| 3,112,767 A * | 12/1963 | Cator | ...................... | F16L 37/23 285/277 |
| 3,174,508 A * | 3/1965 | Zahuranec | ............. | F16L 37/23 285/277 |
| 3,177,018 A * | 4/1965 | Goodwin | ................ | F16L 37/40 285/277 |
| 3,346,276 A * | 10/1967 | Snyder, Jr. | ............. | F16L 37/23 285/277 |
| 3,378,225 A * | 4/1968 | Snyder, Jr. | ............. | F16L 37/42 251/149.6 |

(Continued)

FOREIGN PATENT DOCUMENTS

FR      CA 2845060 A1 *    9/2014          F16L 37/138

*Primary Examiner* — David E Bochna
(74) *Attorney, Agent, or Firm* — Raymond Y. Chan; David and Raymond Patent Firm

(57) ABSTRACT

A coupler for connection and assembly of an irrigation system is revealed. The coupler includes a base, a connecting portion and a retaining member. The base is for mounting the connecting portion and the retaining member. The connecting portion is arranged with a first channel and a second channel. The second channel is used to receive an insert that is connected to sprayers or hoses. The coupler features on that the second channel above the retaining member is arranged with a seal ring. While the insert is pressed downward axially, the insert is first against the seal ring so as to prevent water flow from being sprayed out of a gap of the second channel between an inner diameter of the connecting portion and an outer diameter of the insert.

1 Claim, 7 Drawing Sheets

(56) References Cited

U.S. PATENT DOCUMENTS

| | | | | |
|---|---|---|---|---|
| 3,420,497 A | * | 1/1969 | Wilcox | F16L 37/23 |
| | | | | 285/277 |
| 6,027,097 A | * | 2/2000 | Humphreys | F16L 37/23 |
| | | | | 251/149.1 |
| 8,303,000 B2 | * | 11/2012 | Liu | F16L 37/23 |
| | | | | 285/277 |

* cited by examiner

COUPLER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a coupling connector used in an irrigation system and, in particular, to a coupler used for guiding water flow of the irrigation system and connecting to hoses or sprayers.

Description of Related Arts

Refer to FIG. 6 and FIG. 7, a conventional coupler 1a includes a base 5a, a connecting portion 11a and a retaining member 4a. The base 5a is tubular and having a space for mounting the connecting portion 11a and the retaining member 4a. The connecting portion 11a is disposed with a push portion 111a and a tube 15a while the tube 15a has a first channel 52a and a second channel 151a. The first channel 52a is one end of the tube 15a extended to the base 5a. The first channel 52a is set with a threaded portion 51a and a retaining wall 53a having an insertion hole 531a. The retaining wall 53a is used for covering the first channel 52a. The second channel 151a has an opening end 12a. A spring 13a is fitted over and close to the opening end 12a. Thus an insert 6a for connection to sprayers or hoses can be mounted into the second channel 151a.

The retaining member 4a is arranged between the second channel 151a and the first channel 52a. The retaining member 4a consists of a flange 41a and a column head 42a formed by extending the flange 41a. The diameter of the flange 41a is larger than the diameter of the column head 42a. A third channel 44a is disposed in the column head 42a and a second seal ring 3a is arranged around the column head 42a. The insertion hole 531a of the retaining wall 53a is sealed by the second seal ring 3a of the column head 42a. A first seal ring 2a is set between the flange 41a of the retaining member 4a and the retaining wall 53a of the threaded portion 51a. A plurality of through holes 43a is radially disposed on the column head 42a so that the third channel 44a is communicating with the second channel 151a or the first channel 52a by the through holes 43a.

Moreover, the first channel 52a is used for connecting to a water supply means while the second channel 151a is used to mount the insert 6a. The insert 6a is used to connect an outflow tube or sprayers for water output.

When the user mount the insert 6a into the coupler 1a and the insert 6a is assembled with the connecting portion 11a to allow water at the end of the threaded portion 51a flowing from the first channel 52a to a fourth channel 64a of the insert 6a to be output, the insert 6a is axially mounted into the second channel 151a of the connecting portion 11a. Then the retaining member 4a is pressed downward to the first channel 52a so that one end of the second seal ring 3a arranged at the column head 42a of the retaining member 4a is away from the insertion hole 531a and one of the through holes 43a of the column head 42a is communicating with the first channel 52a. Thus the water flow from the first channel 52a can be guided into the through holes 43a of the retaining member 4a and then flows through the fourth channel 64a of the insert 6a to be output.

In the conventional coupler, the first seal ring 2a is arranged at the second channel 151a and located between the flange 41a of the retaining member 4a and the retaining wall 53a of the threaded portion 51a. When the insert 6a is pressed downward toward the retaining member 4a, the insert 6a will firstly lean against the upper edge of the flange 41a of the retaining member 4a, instead of the first seal ring 2a. Thus a part of water flow will be sprayed out of a gap between the second channel 151a and the insert 6a. The sprayed water flow will not stop until the insert 6a leans against the first seal ring 2a. Thus the user can be splashed by the sprayed water flow.

SUMMARY OF THE PRESENT INVENTION

Therefore a primary object of the present invention is to provide a coupler for assembly and connection of an irrigation system. The coupler can be connected to an insert so as to guide water flow of the irrigation system and connect to sprayers or hoses.

In order to achieve the above object, an insert of the present invention includes an assembly portion, a circular toothed portion, a guide tube, and a fourth channel. The assembly portion is extended to form the circular toothed portion while the other end of the circular toothed portion is tapered and extended to form the guide tube. The fourth channel is axially penetrating the assembly portion, the circular toothed portion and the guide tube to guide the water flow. To put it simply, the assembly portion is extended to form the circular toothed portion and further extended to form the guide tube while the fourth channel is axially penetrating the assembly portion, the circular toothed portion and the guide tube.

The coupler includes a base, a connecting portion and a retaining member. The base is to receive the connecting portion and the retaining member. The connecting portion is disposed with a first channel and a second channel. The second channel is for mounting an insert that is connected to sprayers or hoses. The retaining member is composed of a flange, a column head, and a third channel. The column head is formed by extending the flange while the third channel is extended from the flange to the column head. The retaining member is located between the first channel and the second channel of the connecting portion to temporarily close the first channel.

When the insert is axially mounted into the second channel of the connecting portion, the insert presses the retaining member downward so that the first channel will be opened. Thus the water flow can pass through the fourth channel of the insert and flow into the sprayers or hoses connected. The coupler features on that the second channel is arranged with a circular groove located above the flange of the retaining member and a first seal ring is seated in the circular groove. While the insert presses the retaining member downward axially, the rear end of the insert firstly leans against the first seal ring, then passes the first seal ring, and leans against the flange of the retaining member. This design prevents water flow from being sprayed out of the gap between the second channel and the outer diameter of the insert.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
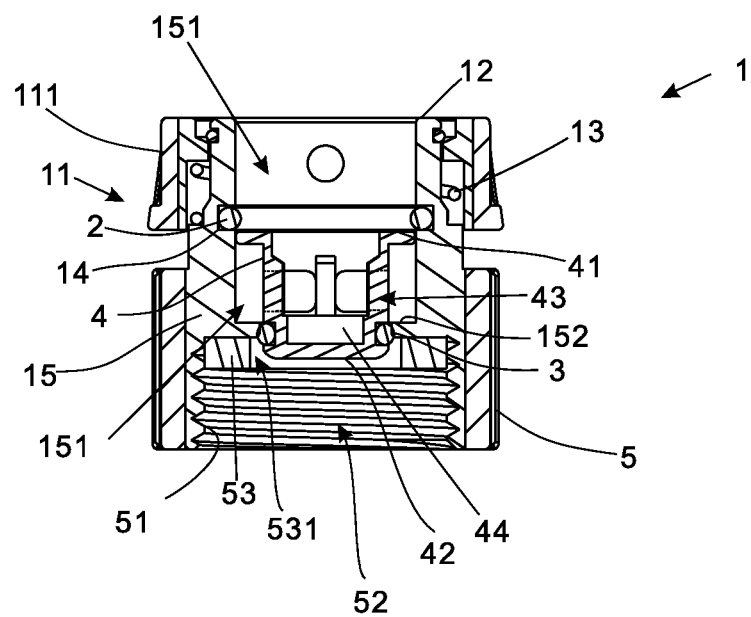
FIG. 1 is a cross sectional view of an preferred embodiment of a coupler according to the present invention.

As shown in FIG. 1, a coupler 1 of the present invention includes a base 5, a connecting portion 11 and a retaining member 4. The base 5 is tubular space to receive the connecting portion 11. The connecting portion 11 is disposed with a push portion 111 and a tube 15, while an inner diameter of the tube 15 is divided into a first channel 52 and a second channel 151. The push portion 111 is fitted over one end of the outer diameter of the tube 15. The diameter of the first channel 52 is larger than that of the second channel 151. The first channel 52 and the second channel 151 are separated by a rib 152 projecting from an inner wall of the tube 15. The other end of the outer diameter of the tube 15 is extended to the base 5, which means the inner diameter of the base 5 closely covers one end of the outer diameter of the tube 15.

The first channel 52 is disposed with a threaded portion 51 and a retaining wall 53. The retaining wall 53 covers the first channel 52. That means the retaining wall 53 is arranged under the rib 152 of the second channel 151 and is disposed with an insertion hole 531. The diameter of the insertion hole 531 fits the outer diameter of the column head 42 of the retaining member 4. The second channel 151 has an opening end 12. A spring 13 is fitted between the outer diameter of the opening end 12 and the push portion 111. Thus the push portion 111 can be moved vertically and turned back at one end of the tube 15 by the spring 13.

The retaining member 4 is disposed between the second channel 151 and the first channel 52. The retaining member 4 is composed of a flange 41, a column head 42, and a third channel 44. The column head 42 is formed by extension of the flange 41. The diameter of the flange 41 is larger than the diameter of the column head 42, while the diameter of the flange 41 fits the diameter of the second channel 151. The flange 41 is just against the rib 152 of the second channel 151. The diameter of the column head 42 matches the diameter of the insertion hole 531. A second seal ring 3 is arranged around the outer diameter of one end of the column head 42. A plurality of through holes 43 is radially disposed on the column head 42. By the second seal ring 3, the column head 42 seals the insertion hole 531 of the retaining wall 53 and temporarily prevents the water in the first channel 52 from flowing to the second channel 151. The third channel 44 is extended from the flange 41 to the column head 42, without penetrating the column head 42. The third channel 44 is communicating with the second channel 151 or the first channel 52 by the through holes 43 on the column head 42. The present invention features on that a circular groove 14 is arranged around a wall of the second channel 151 above the flange 41 of the retaining member 4 and a first seal ring 2 is mounted in the circular groove 14.

Figure 2:
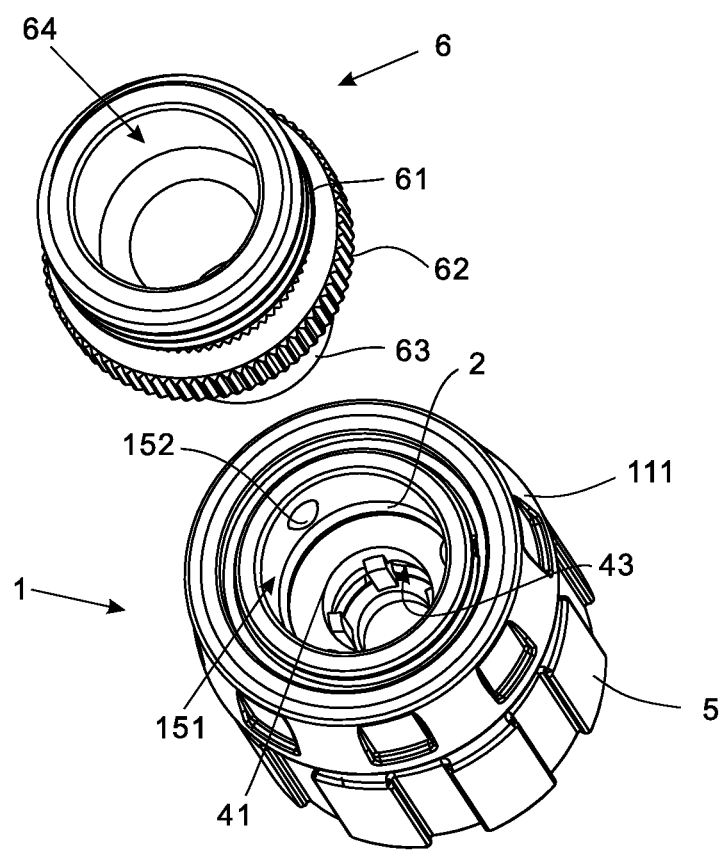
FIG. 2 is a perspective view of the above preferred embodiment of a coupler and an insert according to the present invention.

As shown in FIG. 2, the insert 6 for connection to sprayers or hoses consists of an assembly portion 61, a circular toothed portion 62, a guide tube 63 and a fourth channel 64. The circular toothed portion 62 is formed by extension of the assembly portion 61. The other end of the circular toothed portion 62 is tapered and extended to form the guide tube 63. The assembly portion 61 is disposed with threads for being engaged with the sprayers or hoses. The circular toothed portion 62 is held by the user for assembling the insert 6. As to the guide tube 63, it is used to connect to the coupler 1 and guide the water from the first channel 52 of the coupler 1 to flow into the channels of the sprayers or hoses. The fourth channel 64 is axially penetrating the assembly portion 61, the circular toothed portion 62, and the guide tube 63 for guiding the water flow.

Figure 3:
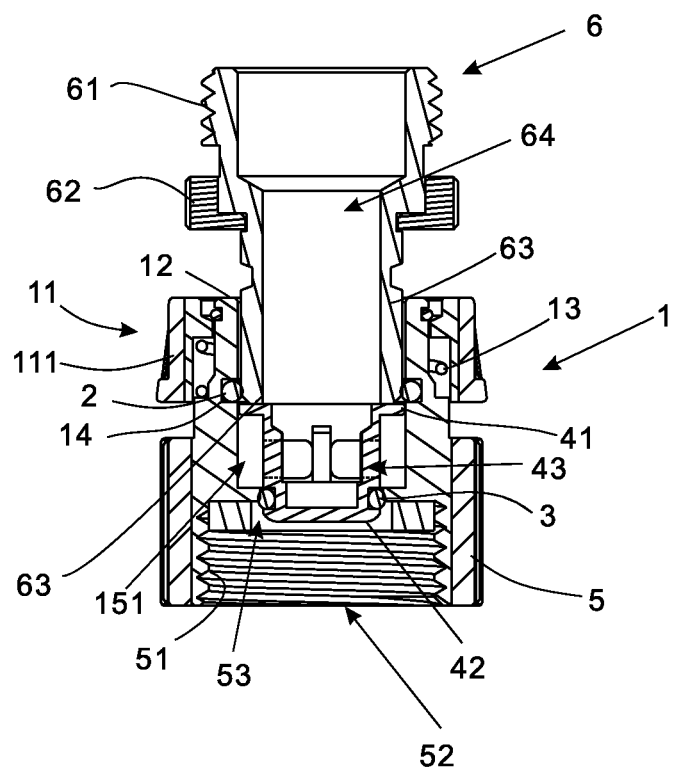
FIG. 3 is a cross sectional view of the above preferred embodiment of a coupler and an insert going to be assembled with each other according to the present invention.
Figure 4:
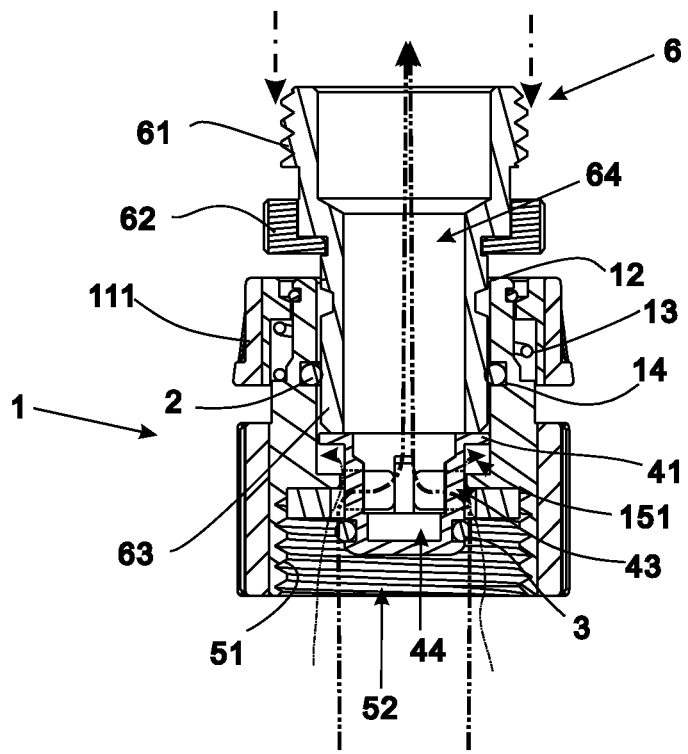
FIG. 4 is a cross sectional view of the above preferred embodiment in which an insert is against and pressing a retaining member of a coupler according to the present invention.
Figure 5:
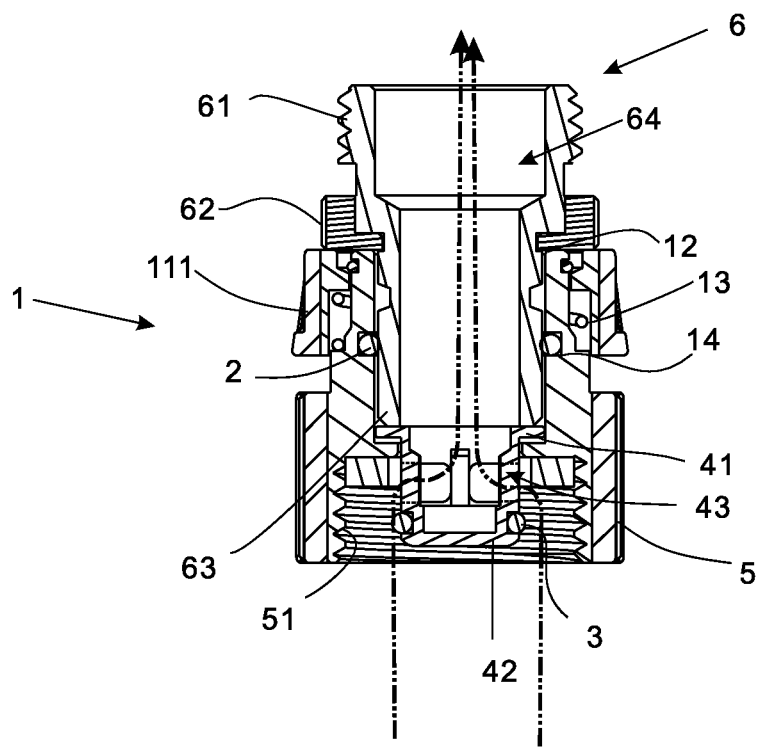
FIG. 5 is a cross sectional view of the above preferred embodiment in which an insert and a coupler has been assembled with each other completely according to the present invention.
Figure 6:
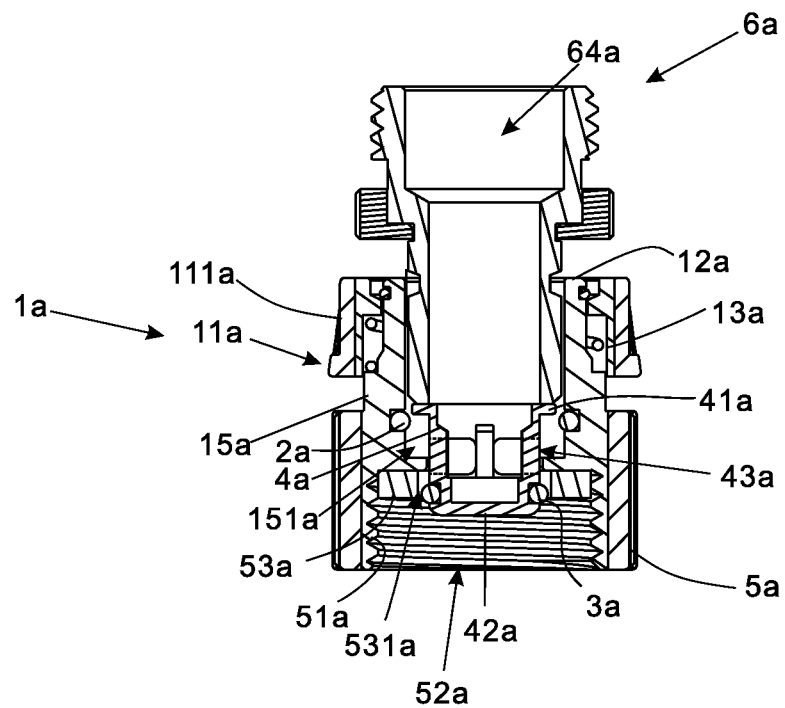
FIG. 6 is a cross sectional view of a coupler in an prior art.
Figure 7:
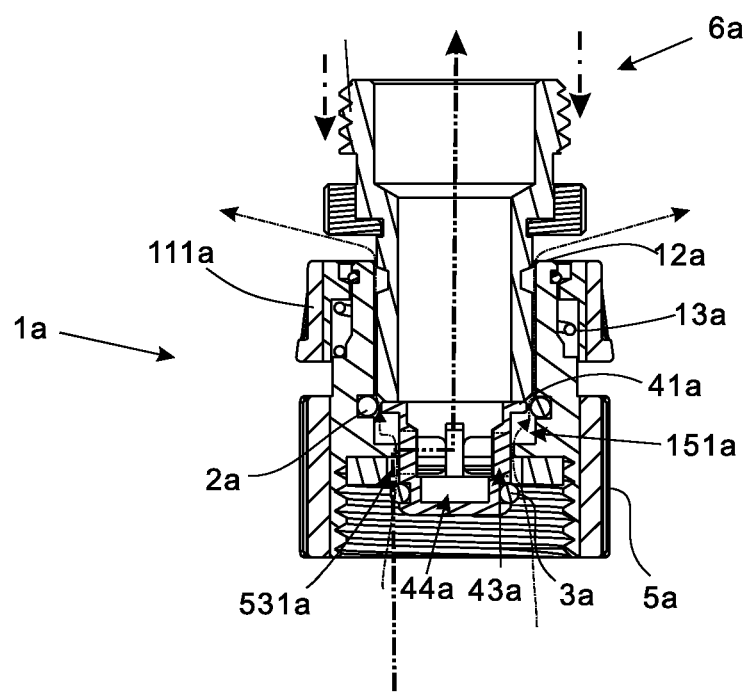
FIG. 7 is a cross sectional view of a prior art in which an insert leans against and presses a retaining member of a coupler.

Refer to FIG. 3, FIG. 4, and FIG. 5, one end of the insert 6 is connected to the sprayer or hose (not shown in figure) and the guide tube 63 of the insert 6 is connected to the coupler 1. After the insert 6 was connected to the connecting portion 11, the hose (not shown in figure) connected to the threaded portion 51 in advance allows water flow from the water supply means flowing through the first channel 52 and the fourth channel 64 of the insert 6 to be output. The insert 6 is connected to the coupler 1 in the following way. First, the guide tube 63 of the insert 6 is mounted into the second channel 151 of the connecting portion 11 axially and then the bottom end of the guide tube 63 of the insert 6 presses the retaining member 4 to move downward toward the first channel 52. Thus, one end of the second seal ring 3 on the column head 42 of the water retaining member 4 is away from the insertion hole 531. And the through holes 43 of the retaining member 4 are communicating with the first channel 52. Therefore, the water flow from the first channel 52 can be guided and flowed through the through holes 43 of the retaining member 4 into the insert 6.

The coupler 1 features on that the first seal ring 2 of the coupler 1 mounted in the circular groove 14 that is located above the flange 41 of the retaining member 4. When the insert 6 presses the retaining member 4 downward, the insert 6 is first against the first seal ring 2 and then against the flange 41 of the retaining member 4, as shown in FIG. 3. The first seal ring 2 shuts off the water flow from the first channel 52 to the gap between the second channel 151 and the insert 6. Then the insert 6 continues pressing the retaining member 4 downward. Refer to FIG. 4, the outer diameter of the insert 6 is sealed by the first seal ring 2, which means the gap between the second channel 151 and the insert 6 is sealed. Thus water flow from the first channel 52 will not be sprayed out of the gap between the second channel 151 and the insert 6. At last, the flange 41 of the retaining member 4 is against the rib 152 on the bottom of the second channel 151. As shown in FIG. 5, the circular toothed portion 62 of the insert 6 is against the opening end 12 of the second channel 151 at the same time. Therefore the assembly of the insert 6 with the coupler 1 has been completed. Now the water flow in the first channel 52 introduced from the water supply means is flowed through the insertion hole 531 of the retaining wall 53, then through holes 43 of the retaining member 4 and the third channel 44 of the retaining member 4 into the fourth channel 64 of the insert 6. At last, the water flow enters the sprayer or hose under the guidance of the fourth channel 64.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A coupler for connection of an irrigation system and connected to an insert to connect to sprayers or hoses and guiding water flow of the irrigation system, comprising:
   a base,
   a connecting portion mounting in the base and having a push portion and a tube, wherein the push portion is fitted over one end of an outer diameter of the tube; an inner diameter of the tube is divided into a first channel and a second channel, wherein the first channel and the second channel are separated by a rib projecting from an inner wall of the tube; a circular groove which is arranged at a wall of the second channel and a first seal ring is seated in the circular groove;
   a retaining member having a flange, a column head, a third channel and a second seal ring, wherein the column head is formed by extending the flange and a diameter of the flange is larger than a diameter of the column head, wherein the flange is against the rib, the second seal ring is arranged at one end of the column head and the third channel is extended from the flange to the column head, wherein the column head is disposed with a plurality of through holes which is radially communicating with the second channel and the retaining member is disposed between the second channel and the first channel;
   the insert having an assembly portion, a circular toothed portion, a guide tube, and a fourth channel, wherein the assembly portion is extended form the circular toothed portion and further extended form the guide tube, wherein the fourth channel is axially penetrating the assembly portion, the circular toothed portion and the guide tube for guiding the water flow, wherein the first seal ring is seated in the circular groove, which is arranged at a wall of the second channel above the flange of the retaining member; while the insert is pressing the retaining member downward axially, the guide tube of the insert is first against the first seal ring and the in contact with the flange of the retaining member; thereby the first seal ring is fit over an outer diameter of the guide tube closely.

\* \* \* \* \*